US012802465B2

(12) United States Patent
Guo et al.

(10) Patent No.: US 12,802,465 B2
(45) Date of Patent: Nov. 17, 2026

(54) COMPUTE SYSTEM WITH VISUAL FRONT-END PROCESSING MECHANISM AND METHOD OF OPERATION THEREOF

(71) Applicant: TeleNav, Inc., Santa Clara, CA (US)

(72) Inventors: Fengyu Guo, Shanghai (CN); Xuehe Zheng, Shanghai (CN); Congmin Bai, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 15 days.

(21) Appl. No.: 19/194,476

(22) Filed: Apr. 30, 2025

(65) Prior Publication Data

US 2025/0384699 A1 Dec. 18, 2025

Related U.S. Application Data

(63) Continuation of application No. 18/452,770, filed on Aug. 21, 2023, now Pat. No. 12,340,598.

(51) Int. Cl.

| | |
|---|---|
| ***G06V 20/56*** | (2022.01) |
| ***G06T 5/80*** | (2024.01) |
| ***G06T 7/13*** | (2017.01) |
| ***G06V 10/25*** | (2022.01) |
| ***G06V 10/44*** | (2022.01) |
| ***G06V 10/74*** | (2022.01) |

(52) U.S. Cl.

CPC .............. *G06V 20/588* (2022.01); *G06T 5/80* (2024.01); *G06T 7/13* (2017.01); *G06V 10/25* (2022.01); *G06V 10/44* (2022.01); *G06V 10/761* (2022.01)

(58) Field of Classification Search

CPC ........ G01C 21/005; G01C 21/20; G06T 5/80; G06T 7/13; G06T 7/73; G06V 10/25; G06V 10/44; G06V 10/761; G06V 20/588

See application file for complete search history.

(56) References Cited

U.S. PATENT DOCUMENTS

| | | | | |
|---|---|---|---|---|
| 7,450,165 | B2 * | 11/2008 | Ahiska ................. | H04N 23/698 348/240.2 |
| 10,496,104 | B1 * | 12/2019 | Liu .................... | G01C 21/1656 |

(Continued)

FOREIGN PATENT DOCUMENTS

WO WO-2022120733 A1 * 6/2022 ......... G01C 21/3815

OTHER PUBLICATIONS

"Computing Systems for Autonomous Driving: State of the Art and Challenges"—Liu et al., IEEE Internet of Things Journal , vol. 8, No. 8, Apr. 15, 2021 (Year: 2021).*

(Continued)

*Primary Examiner* — Mainul Hasan

(74) *Attorney, Agent, or Firm* — Perspectives Law Group, Corp.

(57) ABSTRACT

A compute system includes: a control circuit configured to: store a sensor data stream of a region of interest provided by optical sensors, analyze an overlap region of the sensor data stream to identify a feature line that is viewed by a first optical sensor and a second optical sensor of the optical sensors, calculate a correction distance, measured in pixels, for the first optical sensor by a position correction of the feature line in the overlap region, correct an optical distortion of the first optical sensor in the sensor data stream for the region of interest by applying the correction distance, and calculate GPS coordinates of the feature line for controlling a device.

20 Claims, 8 Drawing Sheets

(56) References Cited

U.S. PATENT DOCUMENTS

| | | | | |
|---|---|---|---|---|
| 2002/0044153 | A1* | 4/2002 | Hoch | H04N 21/434 348/E5.022 |
| 2017/0230558 | A1* | 8/2017 | Morales | A61B 1/00006 |
| 2017/0359510 | A1* | 12/2017 | Lane | G01C 11/025 |
| 2018/0093664 | A1* | 4/2018 | Kim | B60W 30/06 |
| 2018/0241923 | A1* | 8/2018 | Lu | G06F 18/22 |
| 2019/0102897 | A1* | 4/2019 | Lewis | G06T 7/564 |
| 2020/0092533 | A1* | 3/2020 | Narasimhan | H04N 13/211 |
| 2020/0223434 | A1* | 7/2020 | Campos Macias | G06N 20/20 |
| 2022/0333950 | A1* | 10/2022 | Akbarzadeh | G01C 21/3804 |
| 2024/0094384 | A1* | 3/2024 | Gerardo Castro | B60W 60/0027 |
| 2026/0099146 | A1* | 4/2026 | Lotan | G05D 1/2435 |

OTHER PUBLICATIONS

"All-in-One Urban Mobility Mapping Application with Optional Routing Capabilities"—Thompson et al., 2018 IEEE International Conference on Big Data (Big Data) (Year: 2018).*

"Map-based Lane and Obstacle-free Area Detection"—Kowsari et al., 2014 International Conference on Computer Vision Theory and Applications (VISAPP), Date of Conference: Jan. 5-8, 2014 (Year: 2014).*

* cited by examiner

COMPUTE SYSTEM WITH VISUAL FRONT-END PROCESSING MECHANISM AND METHOD OF OPERATION THEREOF

CROSS REFERENCE TO RELATED APPLICATION

This application is a Continuation of co-pending U.S. patent application Ser. No. 18/452,770 filed Aug. 21, 2023, and the subject matter thereof is incorporated herein by reference thereof.

TECHNICAL FIELD

An embodiment of the present invention relates generally to a compute system, and more particularly to a system with a visual simultaneous localization and mapping (SLAM) system.

BACKGROUND ART

As autonomous vehicles emerge on the scene, they require detailed high definition maps that can display every aspect of a roadway along a route and a network that can verify features listed in the high definition maps. The optical network can consist of multiple cameras that observe all sides of the environment around the autonomous vehicle. The combination of the optical network and a high definition map are required for safe operation of the autonomous vehicle.

Thus, a need still remains for a compute system with a visual simultaneous localization and mapping (SLAM) mechanism to provide increased speed and lower overhead for translating the optical sensor stream of data into digitally processible information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including storing a sensor data stream, of a region of interest, provided by optical sensors; analyzing an overlap region of the sensor data stream to identify a feature line that is viewed by a first optical sensor and a second optical sensor of the optical sensors; calculating a correction distance, measured in pixels, for the first optical sensor by a position correction of the feature line in the overlap region; correcting an optical distortion, of the first optical sensor, for the region of interest by applying the correction distance; and calculating GPS coordinates of the feature line for controlling a device.

An embodiment of the present invention provides a compute system, including a control circuit configured to: store a sensor data stream of a region of interest provided by optical sensors, analyze an overlap region of the sensor data stream to identify a feature line that is viewed by a first optical sensor and a second optical sensor of the optical sensors, calculate a correction distance, measured in pixels, for the first optical sensor by a position correction of the feature line in the overlap region, correct an optical distortion of the first optical sensor for the region of interest by applying the correction distance, and calculate GPS coordinates of the feature line for controlling a device.

An embodiment of the present invention provides a non-transitory computer readable medium including instructions for a compute system, including: storing a sensor data stream, of a region of interest, provided by optical sensors; analyzing an overlap region of the sensor data stream to identify a feature line that is viewed by a first optical sensor and a second optical sensor of the optical sensors; calculating a correction distance, measured in pixels, for the first optical sensor by a position correction of the feature line in the overlap region; correcting an optical distortion, of the first optical sensor, for the region of interest by applying the correction distance; and calculating GPS coordinates of the feature line for controlling a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
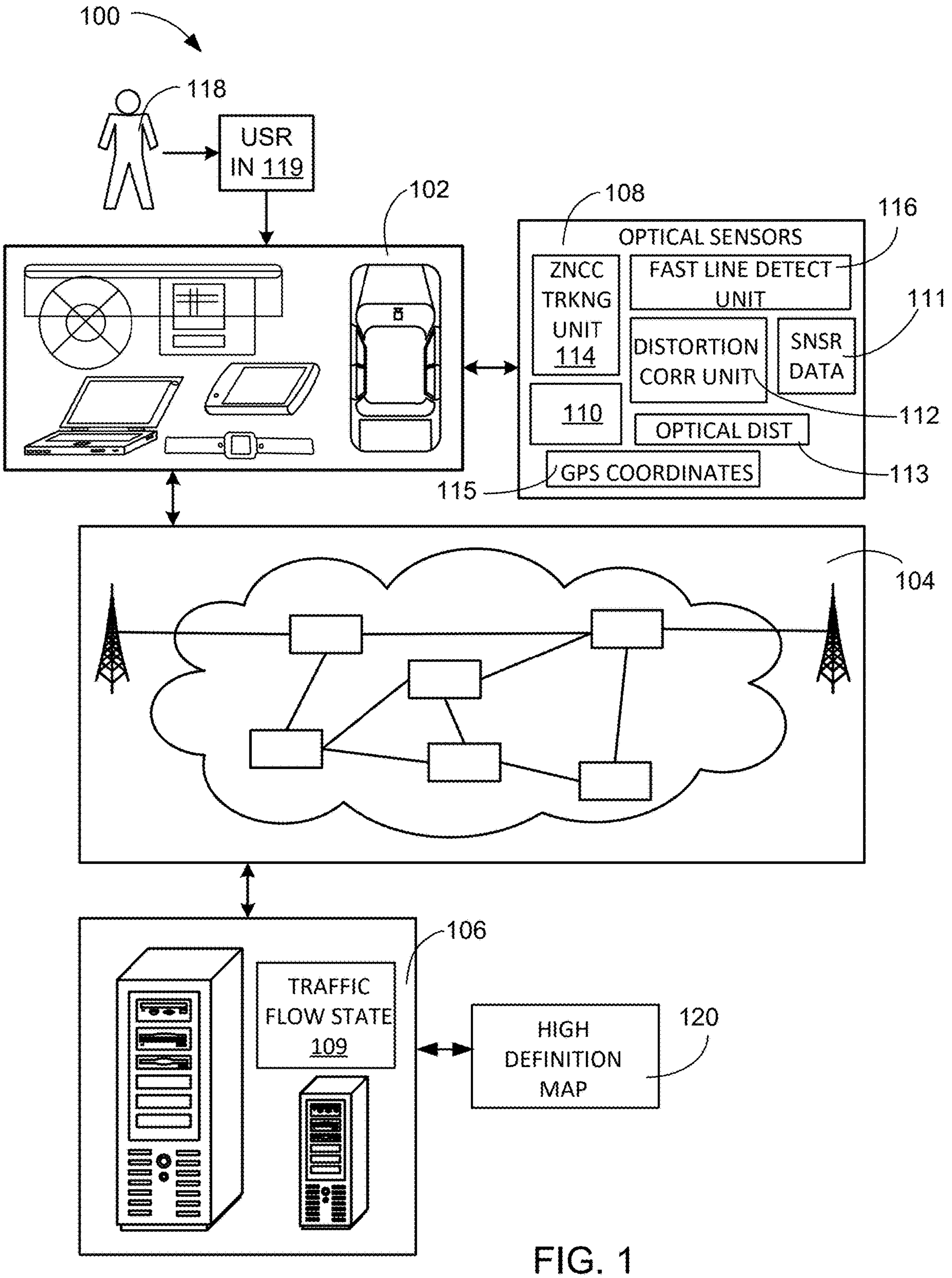
FIG. 1 is a block diagram of a compute system with a visual simultaneous localization and mapping (SLAM) mechanism in an embodiment of the present invention.

The features described, on an individual basis, can be executed in combination without altering the claimed invention. The description of the individual features is for clarity and understanding of the depth and breadth of the claimed invention, without limitation on the combination of those features. The execution of any combination of the features is possible.

An optical network can consist of four cameras with fisheye lenses that are strategically placed to observe all sides of an autonomous vehicle. The functioning of these cameras is imperative to the safe operation of the autonomous vehicles. As these vehicles age, the extrinsic and intrinsic parameters can drift away from the original values. The changes could be the result of an oxidized lens, dirt or debris on the lens or housing of the camera, position changes on the body of the vehicle, or a combination of such elements. In order to address the real-time changes in the optical network, an automatic optical calibration mechanism can dynamically tune the extrinsic and intrinsic parameters and alert the user that a parametric deficiency has been detected.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a vehicle, an artifact, or a pixel in an optical data frame. An essential function, for converting the optical feedback to a useable format with the high definition map, is a visual simultaneous localization and mapping (SLAM) mechanism.

The term "module" referred to herein can be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below, the "unit" is deemed to include hardware circuitry for the purposes and the scope of the system claims.

The units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

The term "extrinsic parameter" as used in this description means the pose of the camera being analyzed. The pose of the camera defines the physical relationship between camera and the real world objects the camera is viewing. The variables used to analyze the pose are direction, pitch, and yaw. The term "intrinsic parameter" as used in this description means the physical parameters within the camera including the focal length, lens distortion coefficient, scaling factor, principal point location, and size of the pixels. The combination of the extrinsic parameters and the intrinsic parameters define the physical conversion of the real-world view to the corrected captured image within the camera.

The term "fuse" or "fusing" as used in the specification and the claims have the meaning of combining, concatenating, merging, or integrating as appropriate for the usage of the term. In the case of the optical network, fusing the views of adjacent cameras can identify elements that are displayed in more than one view from adjacent cameras.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a compute system 100 with a visual simultaneous localization and mapping (SLAM) mechanism in an embodiment of the present invention. The compute system 100 can include a first device 102, such as a client or a server, connected to a second device 106, such as a client or server.

The compute system 100 can include a system for capturing detailed information about a current environment based on fusion of multiple sources to reconcile and quickly identify specific details about the region of travel. The first device 102 can communicate with the second device 106 through a network 104, such as a wireless or wired network.

For example, the first device 102 can be of any of a variety of computing devices, such as a cellular phone, personal digital assistant, a notebook computer, an autonomous vehicle, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the network 104 to communicate with the second device 106 or can be a stand-alone device. The first device 102 can further be separate from or incorporated with a vehicle, such as a car, truck, bus, or motorcycle.

For illustrative purposes, the compute system 100 is described with the first device 102 as a mobile computing device, although it is understood that the first device 102 can be different types of devices. The first device 102 can be an autonomous vehicle or an accessory device coupled to the telematics vehicle network to support an autonomous vehicle.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as endpoints of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The compute system 100 can provide additional features that are not available in prior art compute systems. The first device 102 can be coupled to optical sensors 108 that include a sensor data local storage 110. The optical sensors 108 are monitoring devices, such as a set of monocular cameras positioned on the first device 102, configured to monitor, observe, record, or a combination thereof the surroundings of the first device 102. The sensor data local storage 110 provides a non-transitory storage medium loaded by a distortion correction unit 112 to store a sensor data stream 111 captured by the optical sensors 108. The distortion correction unit 112 can be a hardware structure that provides machine learning and can include four banks of the memory that can be loaded from the sensor data stream 111 of the optical sensors 108 for manipulation of the sensor data stream 111 in order to identify and correct optical distortion from the optical sensors 108. The distortion correction unit 112 can include circuitry that analyzes the overlap region from each of the optical sensors 108 to identify items or elements that appear in more than one of the optical sensors 108 in order to identify an optical distortion 113 of the optical sensors 108.

The distortion correction unit 112 can be coupled to a zero-mean normalized cross-correlation (ZNCC) tracking unit 114, in the sensor data local storage 110, capable of analyzing fixed size frames from each of the optical sensors 108, such as periodically captured the sensor data stream 111 can be analyzed by a fast line detect unit 116 coupled to the ZNCC tracking unit 114 in succession. The ZNCC tracking unit 114 can be a hardware structure that receives the output of the fast line detect unit 116, such as the matched line pairs between successive frames of the sensor data stream 111. The ZNCC tracking unit 114 also receives GPS coordinates 115 from the first device 102. Once processed, the ZNCC tracking unit 114 can serially correct the GPS coordinates 115 of lines and features in the sensor data stream 111. It is understood that the GPS coordinates 115 can include latitude, longitude, and elevation of a single point or pixel in the sensor data stream 111.

For example, the sensor data local storage 110 can be implemented in a number of ways, such as a non-volatile storage device, such as a hard disk drive, a solid state storage device (SSD), a FLASH memory card, or a combination thereof capable of fusing the sensor data stream 111 from each of the optical sensors 108 into the fast line detect unit 116 for further analysis by the ZNCC tracking unit 114.

The distortion correction unit 112 can provide a pixel evaluation module, that can be implemented in software running of specialized hardware, full hardware, or a combination thereof configured to analyze a photographic scene to identify features and lines around the first device 102. The data can include road markings, lane lines, road boundaries, traffic control devices, crosswalks, lane markers, buildings, physical structures, signage, lighting, or a combination thereof. The distortion correction unit 112 can process a sensor data stream 111, including sampled frames of data from each or the optical sensors 108, in order to provide the ZNCC tracking unit 114 with relative locations of features based on the physical location of the optical sensors 108.

The ZNCC tracking unit 114 can process the sensor data stream 111 in order to identify the geographic location of the lines and features in the sensor data stream 111. The fast line detection unit 116 can identify lines and shapes from the sensor data stream 111 of a roadway in a region surrounding the first device 102. It is understood that the compilation of the sensor data stream 111 from four of the optical sensors 108 can be analyzed by the fast line detection unit 116. The fast line detection unit 116 is a hardware structure supported by software that can identify lines and shapes in the view of the region surrounding the first device 102. The fast line detection unit 116 provides a fusing of the sensor data stream 111 from each of the optical sensors 108, including identifying any overlap view of features that are observed in more than one of the optical sensors 108. The distortion correction unit 112 can provide position correction of features and elements that are duplicated in more than one of the sensor data stream 111. It will be understood that wide angle lenses of the optical sensor 108 will provide overlap regions that observe the same objects from different angles. The distortion correction unit 112 can correct the pose error caused by these overlap regions during the fusing of the sensor data stream 111. The fast line detection unit 116 can process the fused version of the sensor data stream 111.

The sensor data local storage 110 can be coupled to or integrated with the optical sensors 108 in order to store a sensor data stream 111 from each of the optical sensors 108 available in the first device 102. The first device 102 can access the distortion correction unit 112 to adjust for the relative performance of the optical sensors 108. The distortion correction unit 112 can be trained to identify and adjust the intrinsic parameters of the optical sensors 108. The distortion correction unit 112 can identify and correct the optical distortion 113 in order to pass the corrected content of the sensor data local storage 110 to the ZNCC tracking unit 114 for feature tracking between successive frames of the sensor data stream 111.

The compute system 100 can be operated without the user 118. The user 118 can include a person or an entity accessing or utilizing the compute system 100 or a device therein. For example, the user 118 can include a person owning or operating the first device 102, a service, or a combination thereof. Also, for example, the user 118 can access or utilize the second device 106 through the first device 102, a service, or a combination thereof. The second device 106 can access a high-definition map 120 to provide detailed route information to the first device 102. The second device 106 can provide a traffic flow state 109 to the first device 102 to provide additional information for controlling the first device 102. The traffic flow state 109 can be a report or list of vehicles or obstructions in the region travelled by the first device 102.

The compute system 100 can further process a direct user input 119 from the user 118. The direct user input 119 can include the user 118 taking manual control of the autonomous vehicle or the first device 102. The direct user input 119 can be provided by or from the user 118 directly to or directly on the first device 102.

Figure 2:
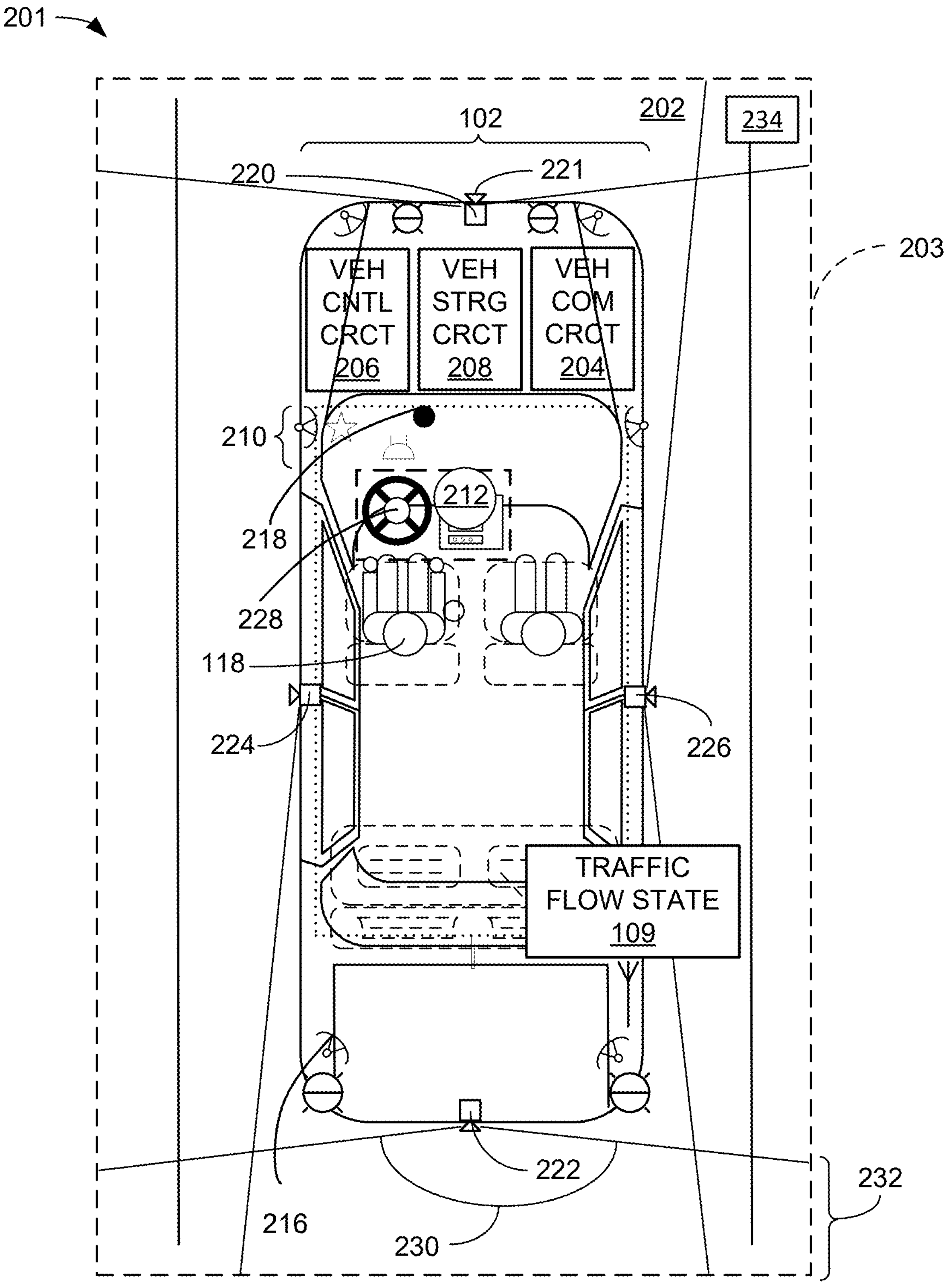
FIG. 2 is an example of a top plan view illustration of a vehicle for the compute system.

Referring now to FIG. 2, therein is shown an example of a top plan view 201 illustration of a vehicle for the compute system 100 of FIG. 1. The compute system 100 can be included in or interact with the first device 102. Since the set-up and calibration of the optical network is performed by a specific process when the autonomous vehicle is first manufactured. The degradation of the optical network must be periodically verified by the manufacturer during scheduled maintenance. The possible degradation of the optical network between scheduled maintenance can present significant dangers to the passengers and the public. The distortion correction unit 112 of FIG. 1 can identify and adjust variations in the optical sensors 108 of FIG. 1. The distortion correction unit 112 can also alert the user 118 when a specific one of the optical sensors 108 cannot be correctly adjusted.

The first device 102 can be an object or a machine used for transporting people or goods capable of automatically maneuvering or operating the object or the machine. The first device 102 can include vehicles accessible by the user 118 of FIG. 1 for control, maneuver, operation, or a combination thereof. For example, the first device 102 can include a car, a truck, a cart, a drone, or a combination thereof.

The first device 102 can further be controlled or maneuvered without the direct user input 119 of FIG. 1 corresponding to the maneuver or the movement. For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102 without the direct user input 119. Also, for example, the first device 102 can be controlled or maneuvered by the compute system 100, including the compute system 100 controlling or setting a cruising speed, lane position, or other physical maneuvers or movements of the first device 102.

The compute system 100 can further utilize the distortion correction unit 112 from one or more vehicles or devices. The distortion correction unit 112 can provide important reliability information and adjustments for a front optical sensor 220, a rear optical sensor 222, a left optical sensor 224, and a right optical sensor 226. Each of the front optical sensor 220, the rear optical sensor 222, the left optical sensor 224, and the right optical sensor 226 can be a hardware camera including a fisheye lens 221 having a 170 degree view of a region of interest 203

The first device 102 or other vehicles interfacing with the compute system 100 can include a device, a circuit, one or more specific sensors, such as environmental sensors 210, or a combination thereof for providing assistance or additional information to the user 118 controlling, maneuvering, or operating the first device 102. The environmental sensors 210 can include a cabin camera, LiDAR sensors, the optical sensors 108, or a combination thereof. The optical sensors 108 can be camera with a wide-angle lens, such as the fisheye lens 221. The optical sensors 108 can be mounted on the exterior of the first device 102 positioned at the front, rear, left side, and right side of the first device 102. The first device 102 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding first device 102 and configured to store and recall information. The vehicle storage circuit 208 can be a volatile memory, a nonvolatile memory, an internal memory, an external memory, or a combination thereof and can include the sensor data local storage 110 of FIG. 1. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof.

The vehicle control circuit 206 can include a functional unit or circuit integral to the first device 102 and configured as a processor to execute or implement instructions. The vehicle control circuit 206 can execute or implement the vehicle software to provide the intelligence of the corresponding vehicle, the compute system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a functional unit or circuit integral to the corresponding vehicle, such as the first device 102, another vehicle, or a combination thereof. The vehicle communication circuit 204 can be configured to enable external communication to and from the corresponding vehicle. For example, the vehicle communication circuit 204 can permit the first device 102 to communicate with the second device 106 through the network 104 of FIG. 1.

The vehicle communication circuit 204 can also function as a communication hub allowing the corresponding control vehicle to function as part of the network 104 and not limited to be an end point or terminal circuit to the network 104. The vehicle communication circuit 204 can include active and passive components, such as microelectronics, circuitry, or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the second device 106 as end points of the communication, such as for direct line-of-sight communication or peer-to-peer communication. The vehicle communication circuit 204 can further couple with the network 104 to send or receive information through a server or another intermediate device in between endpoints of the communication.

The first device 102 or other vehicles can further include various interfaces. The first device 102 can include one or more interfaces for interaction or internal communication between functional units or circuits of the first device 102. For example, the first device 102 can include one or more interfaces, such as drivers, firmware, wire connections or buses, protocols, or a combination thereof, for the vehicle storage circuit 208, the vehicle control circuit 206, or a combination thereof.

The first device 102 or the other vehicles can further include one or more interfaces for interaction with an occupant, an operator or a passenger, the user 118, or a combination thereof relative to the corresponding vehicle. For example, the first device 102 or the other vehicles can include a user interface 212 including input or output devices or circuits, such as a screen or touch screen, a speaker, a microphone, a keyboard or other input devices, an instrument panel, or a combination thereof.

The first device 102 can further include one or more interfaces along with switches or actuators for physically controlling movable components of the first device 102. For example, the first device 102 can include the one or more interfaces along with the controlling mechanisms to physically perform and control the maneuvering of the first device 102, such as for automatic driving, smart cruise control, or maneuvering features.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the corresponding vehicle, an environment external to and surrounding the corresponding vehicle, or a combination thereof. The environmental sensors 210 can be implement for the first device 102.

For example, the environmental sensors 210 can include a user interface 212, the optical sensor 108, a radar sensor 216, a location-movement sensor 218, or a combination thereof. The user interface 212 can include a projector, a video screen, a touch screen, a speaker, or any combination thereof. The user interface 212 can display a planned route, lane suggestions, speed warnings, vehicle system alerts and combinations thereof.

The optical sensor 108 can include a sensor for detecting or determining visual information representing the environment external to and surrounding of the corresponding vehicle. The optical sensor 108 can include a camera attached to or integral with the corresponding vehicle or device. For example, the optical sensor 108 can include a camera, such as forward-facing camera, a video camera, a rear-view or back-up camera, a side-view or a blind-spot camera, or a combination thereof. Also, for example, the environmental sensors 210 can include an infrared sensor, a night vision video camera, or a night vision sensor.

The optical sensor 108 can further include a camera on the first device 102 or another user device of the user 118 connected to and interacting with a vehicle. The optical sensor 108 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize radio waves to determine or identify an existence of the object or the target, the relative location or a distance relative to the first device 102 or other corresponding device or vehicle, or a combination thereof. For example, the radar sensor 216 can include a proximity sensor or warning system, such as for an area in front of, behind, adjacent to or on a side of, or a combination thereof geographically or physically relative to the first device 102.

The location-movement sensor 218 can be a sensor for identifying or calculating a geographic location of the corresponding vehicle or device, determining a movement or speed of the corresponding vehicle or device, or a combination thereof. The location-movement sensor 218 can include an accelerometer, a speedometer, a Global Positioning System (GPS) receiver or device, a gyroscope or a compass, or a combination thereof. The first device 102 can include the environmental sensors 210 other than or in addition to the location-movement sensor 218. The location-movement sensor 218 can provide a gyroscope rate of change for monitoring turns and a speed from the speedometer.

The compute system 100 can use one or more of the optical sensors 108 corresponding to one or more devices, one or more vehicles, or a combination thereof to generate the traffic flow state 109 describing or representing information regarding the environment surrounding the corresponding device or vehicle. The sensor data stream 111 of FIG. 1 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the optical sensors 108, one or more interfaces, or a combination thereof can be included in or make up the first device 102.

The compute system 100 can provide the vehicle movement control 228 as a suggestion to the user 118 for maneuvering or operating the first device 102. Details regarding the utilization and processing of the vehicle movement control 228 are discussed below.

The compute system 100 can process and generate vehicle movement control 228 for controlling or maneuvering the first device 102. The vehicle movement control 228 is an instruction, a signal, a process, a method, a mechanism, or a combination thereof directing or controlling physical movement or travel of the first device 102.

Continuing with the example, the compute system 100 can use the vehicle movement control 228 provided from the first device 102 without the user input 119. The compute system 100 can utilize the vehicle movement control 228 to provide information, assist maneuvering, control maneuvers, or a combination thereof for other vehicles near the first device 102.

Continuing with the example, the compute system 100 can communicate the traffic flow state 109 through the second device 106 to other devices or vehicles, or directly communicate to the other devices or vehicles, such as for a peer-to-peer communication system. The compute system 100 can communicate the traffic flow state 109 for informing other devices or vehicles of the status of the first device 102 itself, about other vehicles detected and identified around the first device 102, or a combination thereof.

As a more specific example, the compute system 100 can use the traffic flow state 109 to detect weaknesses in the optical sensor 108 that would prevent the safe operation of the vehicle movement control 228, such as for steering, braking, setting or adjusting travel speed, accessary control, or a combination thereof. Details regarding the processing of the vehicle movement control 228 are discussed below.

It is understood that the optical sensors 108 can be positioned at fixed locations around the first device 102. By way of an example, the front optical sensor 220, the rear optical sensor 222, the left side optical sensor 224, and the right optical sensor 226 can monitor the region of interest 203 including the details of the roadway 202. The combination of the sensor data streams 111 of FIG. 1 from each of the front optical sensor 220, the rear optical sensor 222, the left side optical sensor 224, and the right optical sensor 226 can be fused by the distortion correction unit 112 of FIG. 1 to form surrounding view of the region of interest 203.

It is understood that due to the characteristics of the wide-angle lenses and the relative position of the optical sensors 108, objects can appear in more than one of the optical data streams 111. By way of an example, a fisheye viewing angle 230 can generate overlap regions 232 at the four corners of the region of interest 203. It is understood that the fisheye viewing angle 230 can be substantially equal to 170 degrees of view. The resulting ones of the overlap region 232 can have the optical distortion 113 of FIG. 1 resolved by the distortion correction unit 112. By way of an example, a traffic control sign 234 can be viewed by both the front optical sensor 220 and the right optical sensor 226. The distortion correction unit 112 can resolve the traffic control signal 234 to be a single unit of the traffic control sign 234 adjacent to the roadway 202.

Figure 3:
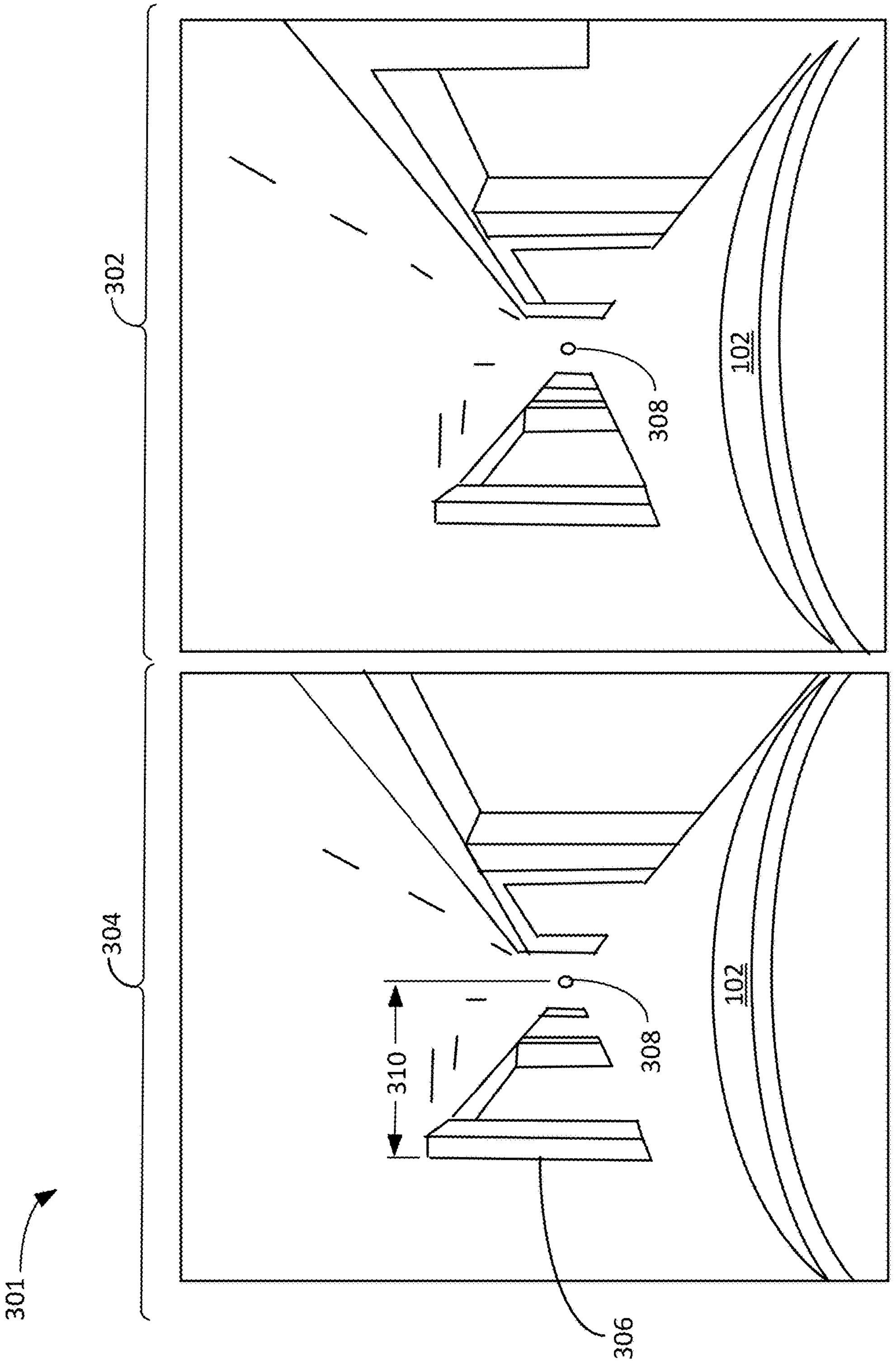
FIG. 3 is an exemplary projection view as processed by the compute system.

Referring now to FIG. 3, therein is shown an exemplary projection view 301 as processed by the compute system 100. The region of interest 203 of FIG. 2 can be represented in an Nth frame 302 and an N+1th frame 304 that is the area viewed by the optical sensors 108 of FIG. 1 of the first device 102. By way of an example, the front optical sensor 220 of FIG. 2, the rear optical sensor 222 of FIG. 2, the left side optical sensor 224 of FIG. 2, and the right optical sensor 226 of FIG. 2 can be combined in the sensor data local storage 110 of FIG. 1 to form the Nth frame 302 and the N+1th frame 304 The front optical sensor 220 can be a high mega-pixel camera having the fisheye lens 221 of FIG. 2. The front optical sensor 220 can provide a wide-angle view that can provide the sensor data stream 111 of FIG. 1. The fast line detection unit 116 of FIG. 1 can process both the Nth frame 302 and the N+1th frame 304 to identify feature lines 306 in the Nth frame 302 and the N+1th frame 304.

A principal point 308 can represent the center and undistorted point in the Nth frame 302 and the N+1th frame 304. As the distance from the principal point 308 increases in all directions, the amount of the optical distortion 113 of FIG. 1 also increases. By assuming a specific relationship between the feature lines 306 extracted from the region of interest 203, the optical distortion 113 can be determined by the distortion correction unit 112 of FIG. 1. It is understood that most of the intrinsic parameters of the front optical sensor 220 are fixed at the time of manufacture. The optical distortion 113 can be a variable based on the condition of the fisheye lens 221. The distortion correction unit 112 can correct the optical distortion 113 in preparation for the fast line detection unit 116 identification of the feature lines 306.

It has been discovered that the distortion correction unit 112 can learn the correction factors including the correction for the feature lines 306 through training and everyday use. A correction distance 310, measured in pixels, can be provided to the fast line detection unit 116 of FIG. 1 for quick analysis and tracking by the ZNCC tracking unit 114.

Figure 4:
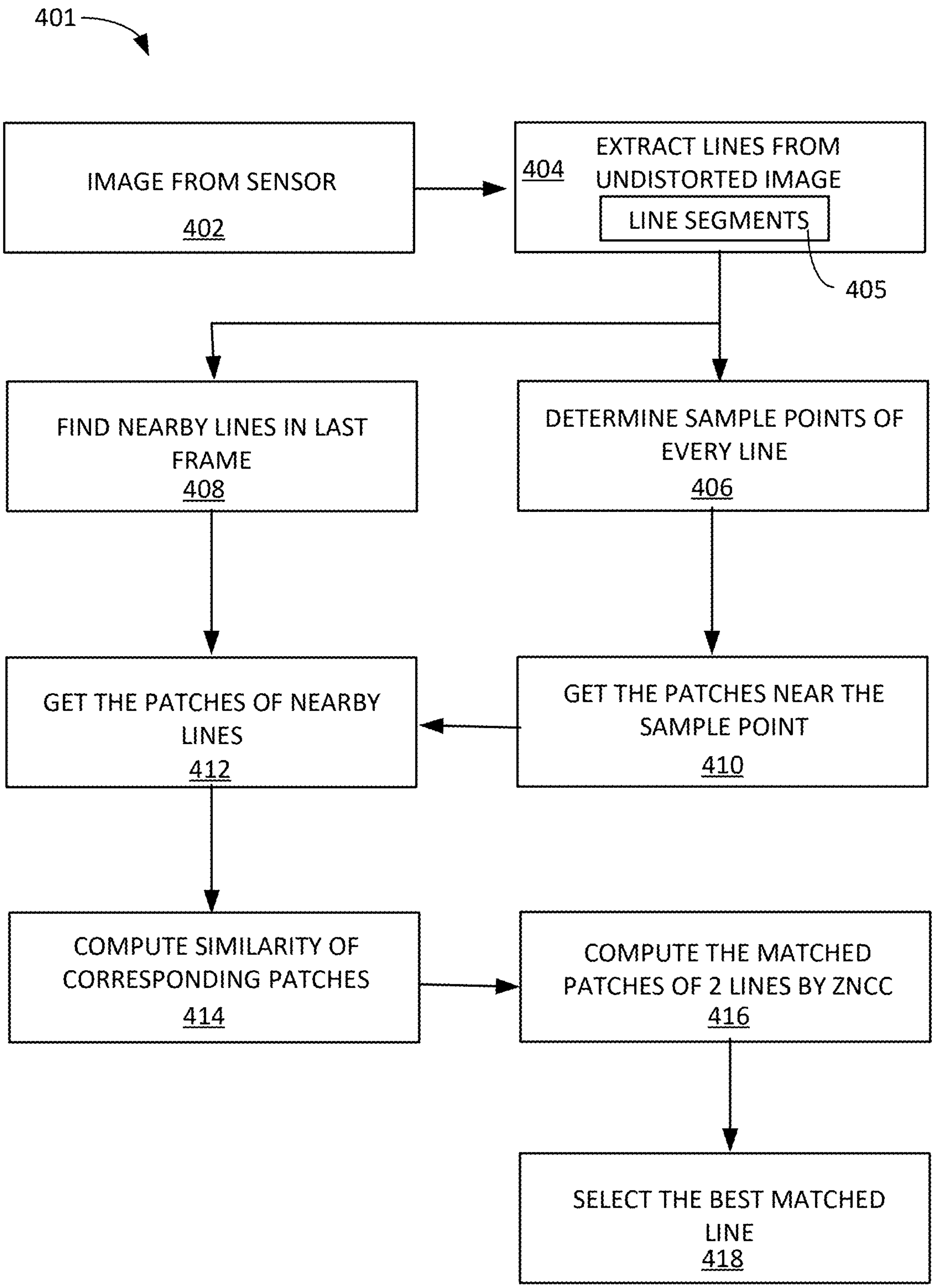
FIG. 4 is shown an exemplary control flow diagram of the compute system.

Referring now to FIG. 4, therein is shown an exemplary control flow diagram 401 of the compute system 100 of FIG. 1. The exemplary control flow diagram 401 depicts an image from sensor block 402 including the correction and fusing of the sensor data stream 111 of FIG. 1 of the optical sensors 108 of FIG. 1 processed by the distortion correction unit 112 of FIG. 1. The view of the. region of interest 203 of FIG. 2 can be processed by the distortion correction unit 112 applying machine learning or fast line detection unit 116 of FIG. 1 to extract edge lines from the optical data stream 111. The machine learning analysis of the distortion correction unit 112 can identify and correct the optical distortion 113 caused by the fisheye lens 221 of FIG. 2.

It is understood that the optical data stream 111 will show the effects of the optical distortion 113 on the feature lines 306 of FIG. 3. The compute system 100 is aware that any of the feature lines 306 identified in the overlap regions 232 of FIG. 2 are the same actual ones of the feature lines 306. This information allows the determination of the optical distortion 113 for the fisheye lens 221 of FIG. 2 and allows the distortion correction unit 112 to remove the effects of the optical distortion 113 from the sensor data stream 111.

The flow can proceed to an extract lines from undistorted image block 404. The fast line detection unit 116 can isolate and identify the feature lines 306 captured by the optical sensors 108 of FIG. 1 within the region of interest 203 of FIG. 2. The fast line detection unit 116 can extract line segments 405 starting from a pixel edge to connect a straight line with a neighboring one of the line segment 405 and continues fitting lines and extending to the next edge pixel until it satisfies co-linearity with the current one of the line segments 405. This process can continue until all of the line segments 405 have been extracted.

The flow can proceed to a determine sample points of every line block 406. The fast line detection unit 116 can identify the relative location of the lines and features captured from the optical data stream 111. The fast line detection unit 116 can separate the lines by applying sample points to each line that was identified. The sample points can be applied by placing the sample points on the beginning, end and evenly spaced along the lines. The sample points can be analyzed and compared to further define the lines.

The flow can proceed to a find nearby lines in last frame block 408 for further analysis. The fast line detection unit 116 can further characterize the extracted ones of the feature lines 306 of FIG. 3 by adding a sample point at the center of the line and defining an angle Theta between the line and horizontal plane. The fast line detection unit 116 can examine the Nth frame 302 of FIG. 3 and the N+1th frame 304 of FIG. 3 for hints of the solution.

The flow proceeds from the determine sample points of every line block 406 to a get patches near the sample point block 410. The get patches near the sample point block 410 can collect an array of pixels surrounding each of the sample points applied to the extracted ones of the feature lines 306. The dimensions of the array can be established by machine learning for the version of the optical sensors 108 of FIG. 1 used in the first device 102 of FIG. 1. By way of an example the dimensions of the pixel patches can be an array of pixels with dimensions 7×7, 5×5, 3×3, or some other symmetrical array, where the X-dimension is equal to the Y-dimension.

The flow can proceed from the find nearby lines in last frame block 408 to a get patches of nearby lines block 412. The get patches of nearby lines block 412 receives input from the find nearby lines in last frame block 408 and the get patches near the sample point block 410. The get patches of nearby lines block 412 can compare and align the nearby lines with the pixel patches identified for the feature lines 306.

The flow proceeds to a compute similarities of corresponding patches block 414 to calculate the similarity of the pixel patches identified in get patches of nearby lines block 412. The similarities of the pixel patches can be calculated by:

$$P'(x', y') = P(x', y') - \frac{1}{(WxH)}\Sigma_{X'',Y''}P(x'', y'') \quad \text{(EQ1)}$$

Where P' is a selected pixel patch of the current frame, P is the pixel patch from the previous frame, X' and Y' are the X and Y positions of the pixel being analyzed in the current frame, and X" and Y" are the X and Y positions of the pixel being analyzed in the previous frame.

The flow then proceeds to a compute the matched patches of 2 lines block by ZNCC 416 in which the ZNCC tracking unit 114 can calculate the matching score of points in the pixel patches. The ZNCC tracking unit 114 can perform the matrix mathematics as follows:

ZNCC stands for Zero Mean Normalized Cross-Correlation. Equation is below

The average gray value is:

$$\overline{Img}(x, y, n) = \frac{1}{(2n+1)^2}\sum_{i=-n}^{n}\sum_{j=-n}^{n} Img(x+i, y+j)$$

Where (x, y) stands for the location of the point in image. 2n+1 stands for the patch size. Img(x, y) stands for the pixel array value at (x, y).

The standard deviation is:

$$\sigma(x, y, n) = \sqrt{\frac{1}{(2n+1)^2}\left(\sum_{i=-n}^{n}\sum_{j=-n}^{n}\left(Img(x+i, y+j) - \overline{Img}(x, y, n)\right)^2\right)}$$

The ZNCC is defined as $$ZNCC(Img_1, Img_2, x_1, y_1, x_2, y_2, n) = \frac{\frac{1}{(2n+1)^2}\sum_{i=-n}^{n}\sum_{j=-n}^{n}\prod_{t=1}^{2}\left(Img_t(x_t+i, y_t+j) - \overline{Img}(x_t, y_t, n)\right)}{\sigma_1(x_1, y_1, n)\times\sigma_2(x_2, y_2, n)}$$

In the below, P1 stands for ($x_1$, $y_1$, n), P2 stands for ($x_2$, $y_2$, n). Where P1 and P2 shall have the same patch size 2n+1.

If the value of the ZNCC (P1, P2) is greater than a first threshold The patches are considered to be similar patches. If the matched patches for the Nth frame 302 and the N+1th frame 304 are greater than a second threshold, the lines are considered to be a good match.

The flow proceeds to a select the best matched line block 418 in order to identify all of the matching lines in the Nth frame 302 and the N+1th frame 304 including identifying their GPS coordinates 115 of FIG. 1 based on the position of the optical sensors 108 and the relative position of the feature lines 306.

Figure 5:
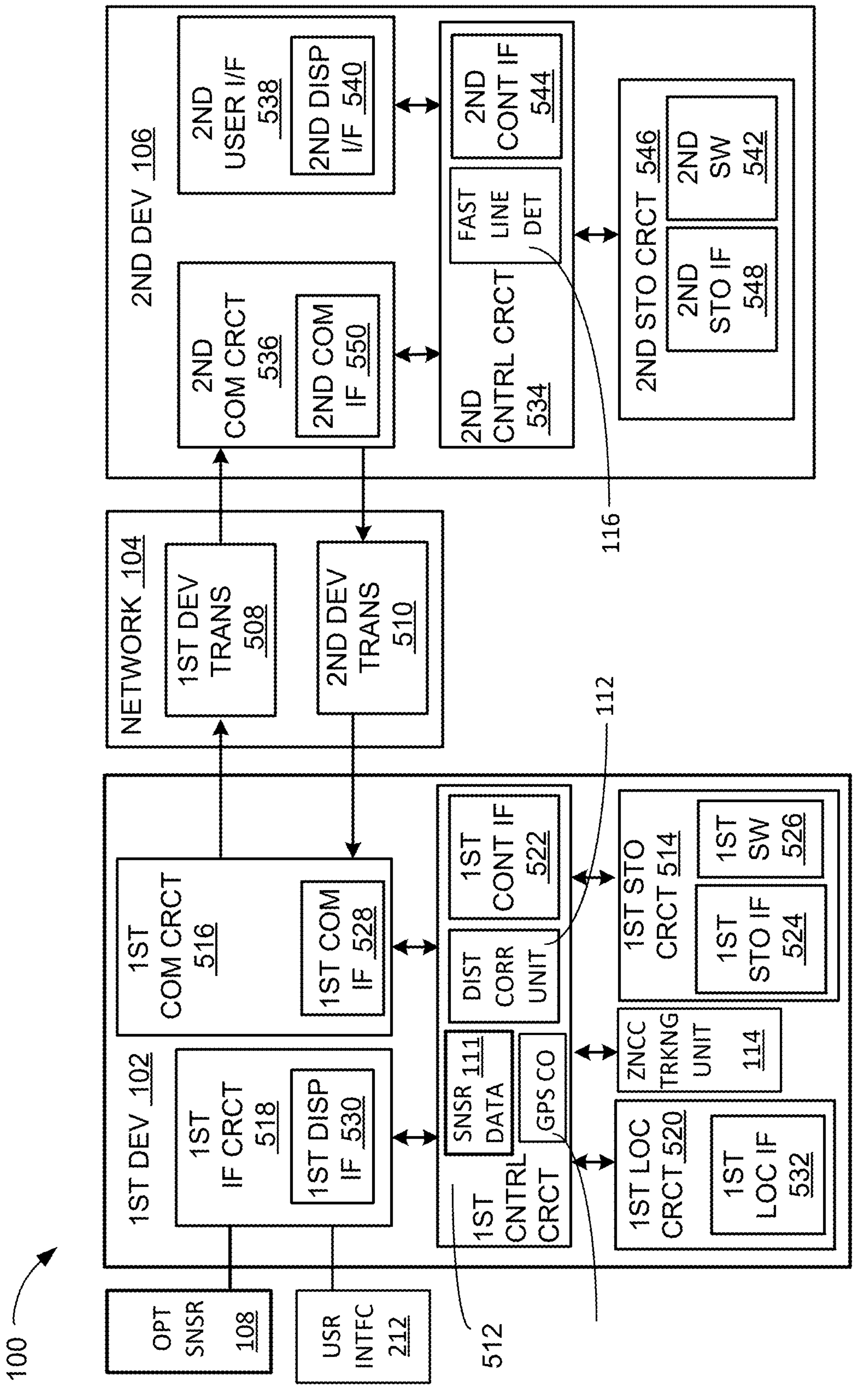
FIG. 5 is an exemplary block diagram of the compute system in an embodiment.

Referring now to FIG. 5, therein is shown an exemplary block diagram of the compute system 100 in an embodiment. The compute system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the compute system 100 is shown with the first device 102 as a client device, although it is understood that the compute system 100 can include the first device 102 as a different type of device. For example, the first device 102 can be a server containing the first display interface 530 coupled to the user interface 212.

Also, for illustrative purposes, the compute system 100 is shown with the second device 106 as a server, although it is understood that the compute system 100 can include the second device 106 as a different type of device. For example, the second device 106 can be a client device. By way of an example, the compute system 100 can be implemented entirely on the first device 102. The second device 106 can provide additional computing speed and power.

Also, for illustrative purposes, the compute system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the compute system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, analogue circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 110 of FIG. 1. The first storage interface 524 can also be used for communication that is external to the first device 102.

The first storage interface 524 can be a hardware circuitry configured to receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522, such as analogue circuitry, digital circuitry, wireless circuitry, or wireline circuitry.

The first communication circuit 516 can enable external communication to and from the first device 102. For example, the first communication circuit 516 can permit the first device 102 to communicate with the second device 106 and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics, analogue circuitry, wireless circuitry, wireline circuitry, or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522, including a microelectromechanical system (MEMS), optical circuitry, waveguides, wireless circuitry, wireline circuitry, analogue circuitry, or a combination thereof.

The first interface circuit 518 allows the user 118 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the optical sensor 108, or any combination thereof to provide data and communication inputs. By way of an example, the optical sensor 108 can connect to the first interface circuit 518 through a wired or wireless connection. The first interface circuit 518 can pass the input from the optical sensor 108 to the first control circuit 512 for processing and storage.

The first interface circuit 518 can include a first display interface 530. The first display interface 530 can include an output device. The first display interface 530 can couple the user interface 212 including a projector, a video screen, a touch screen, a speaker, a microphone, a keyboard, and combinations thereof.

The first control circuit 512 can also execute the first software 526 for the other functions of the compute system

100, including receiving location information from the first location circuit 520. The first control circuit 512 can further execute the first software 526 for interaction with the network 104 via the first communication circuit 516.

The first control circuit 512 can operate the first interface circuit 518 to collect the sensor data stream 111 from the optical sensors 108. The first control circuit 512 can also receive location information from the first location circuit 520. The first control circuit 512 can operate the distortion correction unit 112 of FIG. 1 in order to provide the ZNCC tracking unit 114 with the indicators for the overlap regions 232 of FIG. 2 for further processing and correction of the optical distortion 113 of FIG. 1 in the sensor data stream 111.

The first location circuit 520 can be a hardware circuit configured to generate location information used to identify real world coordinates, such as the GPS coordinates 115 of FIG. 1. The first control circuit 512 can calculate the geolocation of the first device 102 as determined by the location circuit 520 including the geolocation of the optical sensors 108. The first location circuit 520 can be implemented in many ways. For example, the first location circuit 520 can function as at least a part of the global positioning system, an inertial compute system, a cellular-tower location system, a gyroscope, or any combination thereof. Also, for example, the first location circuit 520 can utilize components such as an accelerometer, gyroscope, or global positioning system (GPS) receiver in order to identify the current location on the Earth by satellite triangulation of cell tower triangulation, including calculating pseudo ranges to the satellites or the cell towers.

The first location circuit 520 can include a first location interface 532. The first location interface 532 can be used for communication between the first location circuit 520 and other functional units or circuits in the first device 102, including the optical sensor 108.

The first location interface 532 can receive information from the other functional units/circuits or from external sources, or can transmit information to the other functional units/circuits or to external destinations. The external sources and the external destinations refer to sources and destinations external to the first device 102, including satellites and cell towers.

The first location interface 532 can include different implementations depending on which functional units/circuits or external units/circuits are being interfaced with the first location circuit 520. The first location interface 532 can be implemented with technologies and techniques similar to the implementation of the first control circuit 512, including analogue circuitry, digital circuitry, wireless circuitry, or wireline circuitry.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control circuit 534 can execute a second software 542 to provide the intelligence of the second device 106 of the compute system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the compute system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, analogue circuitry, or a combination thereof.

The second storage circuit 546 can store the second software 542. The second storage circuit 546 can also store the information such as the feature lines 306 identified in the Nth frame 302 and the N+1th frame 304 captured by the first device 102. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the compute system 100 is shown with the second storage circuit 546 as a single hierarchy storage system, although it is understood that the compute system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544. The second storage circuit 546 can support the ZNCC tracking unit 114 as tracking of the feature lines 306 of FIG. 3 identified in the Nth frame 302 and the N+1th frame 304 captured by the first device 102.

The second communication circuit 536 can enable external communication to and from the second device 106. For example, the second communication circuit 536 can permit the second device 106 to communicate with the first device 102 over the network 104. By way of an example, the second device 106 can provide thresholds derived from the ZNCC tracking unit 114 to the other vehicles that are in or near the region of interest 203 of the first device 102.

The second communication circuit 536 can also function as a communication hub allowing the second device 106 to function as part of the network 104 and not limited to be an endpoint or terminal unit or circuit to the network 104. The second communication circuit 536 can include active and passive circuitry components, such as microelectronics, wireless circuitry, wireline circuitry, analogue circuitry, or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544, including circuitry, waveguides, wireless circuitry, wireline circuitry, analogue circuitry, or a combination thereof.

The second communication circuit 536 can couple with the network 104 to send information to the first device 102, including the optimized parameters 120 in the second device transmission 510. The first device 102 can receive information in the first communication circuit 516 from the second device transmission 510 of the network 104. The compute system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

By way of a further example, the first device 102 can be the autonomous vehicle or the driver assisted vehicle. The first interface circuit 518 can receive input from the optical sensor 108 of FIG. 1, for supporting the ZNCC tracking unit 114. The ZNCC tracking unit 114 can be used to identify and track the feature lines 306 identified in the Nth frame 302 and the N+1th frame 304 captured by the first control circuit 512 from the optical sensor 108 and the first location circuit 520.

It has been discovered that the second device 106 can receive fast line detection unit 116 from the first device 102 that provides rapid detection of the feature lines captured in the sensor data stream. in the area of the region of interest 203. As an example, the second control circuit 534 can verify the optimized parameters 120 and pass the information to the second storage circuit 546 for analysis.

Figure 6:
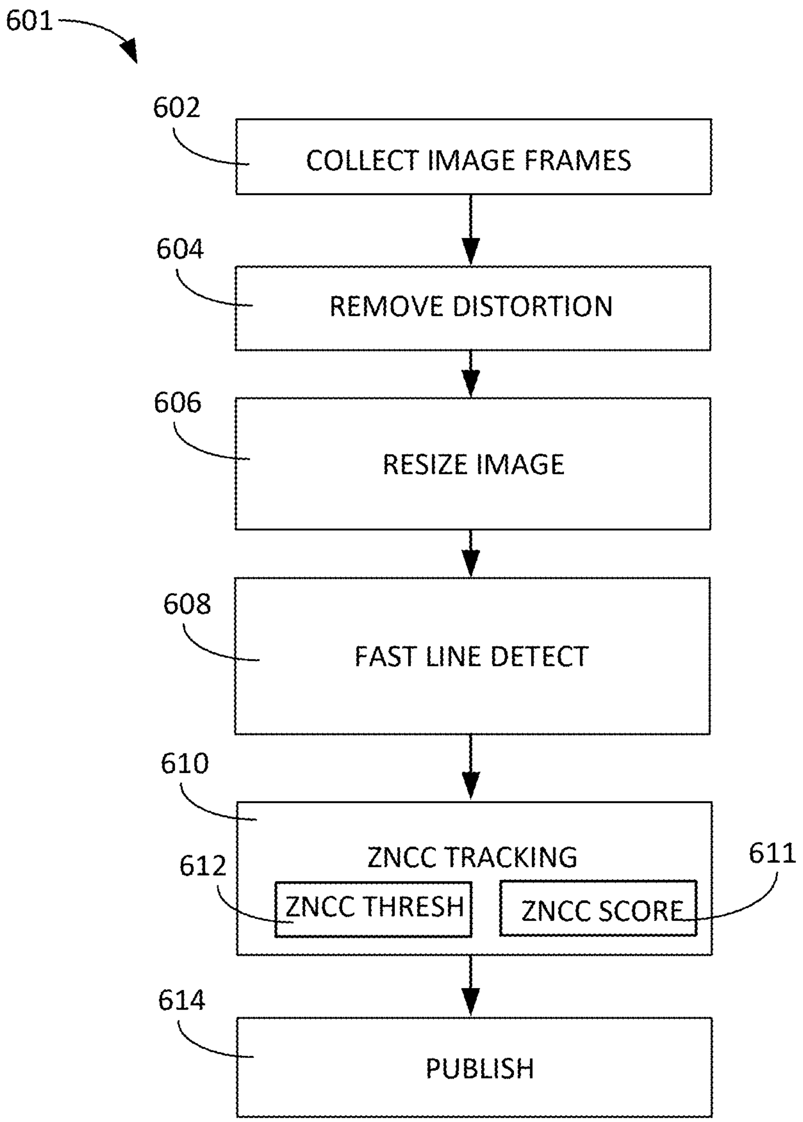
FIG. 6 is exemplary operational flow chart of the compute system in an embodiment of the present invention.

Referring now to FIG. 6, therein is shown an exemplary operational flow chart 601 of the compute system 100 of FIG. 1 in an embodiment of the present invention. The exemplary operational flow chart 601 of the compute system 100 depicts a collect image frames module 602, in which the sensor data stream 111 is captured in the sensor data local storage 110 for analysis and processing. The sensor data local storage 110 can maintain several sequences of the Nth frame 302 and the N+1th frame 304 for analysis.

The flow can proceed to a remove distortion module 604, in which the distortion correction unit 112 of FIG. 1 can identify and correct the optical distortion 113 of FIG. 1 caused by the fisheye lens 221 of FIG. 2 of the optical sensors 108 of FIG. 1. The distortion correction unit 112 can analyze the overlap regions 232 of FIG. 2 to identify and correct the optical distortion 113. It is understood that different versions of the optical sensor 108 can produce different amounts of the optical distortion 113. By analyzing the overlap regions 232, the amount and type of the optical distortion 113 can be identified and corrected.

The flow then proceeds to a resize image module 606, in which the sensor data stream 111 can be filtered to reduce the size of the image file stored in the sensor data local storage 110. By way of an example, the file can be converted from red, green, blue (RGB) to gray scale, or filter a certain number of the pixels captured by the optical sensors 108. The reduced size of the image captured in the Nth frame 302 and the N+1th frame 304 can allow faster identification of the image and feature lines 306.

The flow then proceeds to a fast line detect module 608, in which the Nth frame 302 and the N+1th frame 304 can be processed to extract the feature lines 306 in the image. The extraction of the feature lines 306 can be performed by the fast line detection unit 116 of FIG. 1 and can be performed up to three times faster than the classic Hough Transform when operating on the same image.

The flow then proceeds to a ZNCC tracking module 610 for matching the feature lines 306 between the Nth frame 302 and the N+1th frame 304. The ZNCC tracking unit 114 of FIG. 1 can calculate a ZNCC score 611 for sets of lines that might be a match. The first control circuit 512 of FIG. 5 can compare the ZNCC score 611 to a ZNCC threshold 612 established during the training of the ZNCC tracking unit 114. If the ZNCC score 611 is above the ZNCC threshold 612, the two lines being compared are considered a match for the feature line 306. By identifying the feature lines 306 as the first device 102 travels through the region of interest 203 of FIG. 2. The first control circuit 512 can determine the GPS coordinates 115 of FIG. 1 of the optical sensors 108, which allows the identification of the GPS coordinates 115 of the feature lines 306.

The flow then proceeds to a publish module 614, in which the first control circuit 512 can remove any extraneous lines caused by reflections and noise. The remaining ones of the feature lines 306 can be verified and have the GPS coordinates 115 applied. The feature lines 306 that are published can be compared to the data from the high-definition map 120 of FIG. 1 for controlling the first device 102 in an autonomous vehicle mode.

It has been discovered that the combination of the fast line detection module 609 and the ZNCC tracking module 610 can provide high quality of line extraction for identifying the feature lines 306 in both clarity and location identification. By leveraging the information gained in the Nth frame 302, the N+1th frame 304 can be quickly verified and have the GPS coordinates 115 applied.

Figure 7:
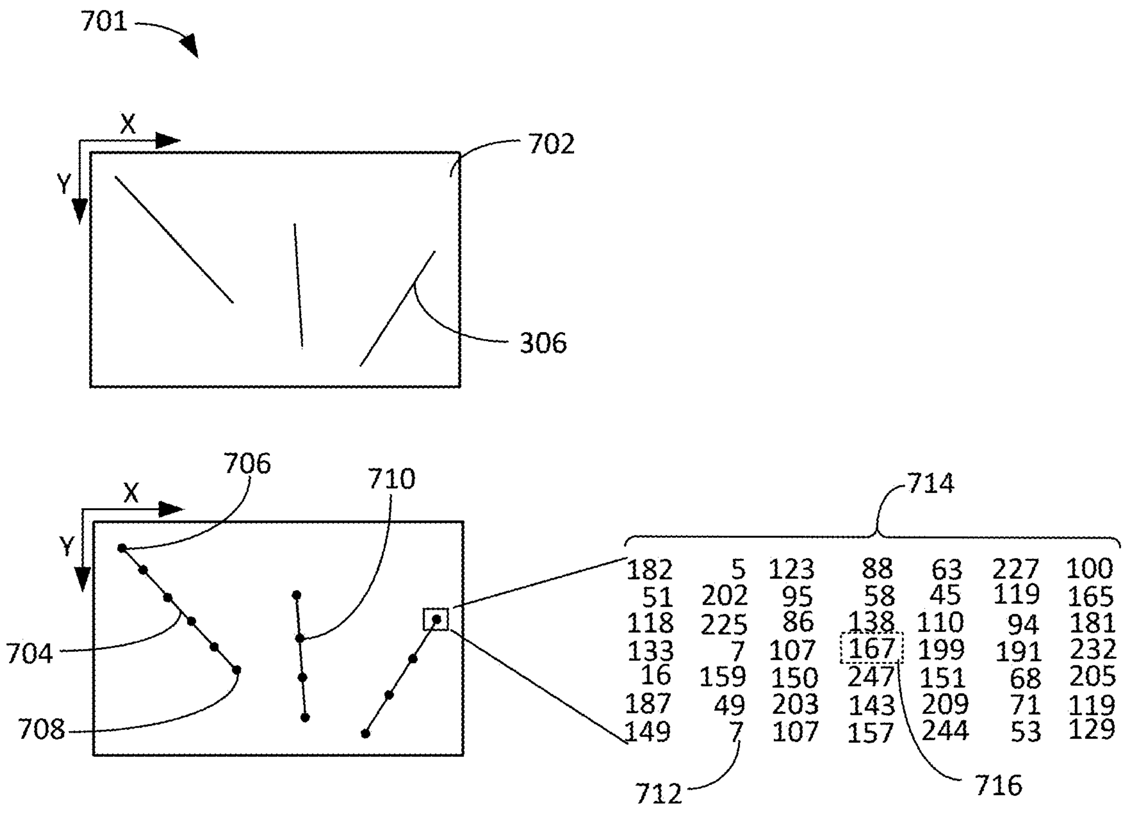
FIG. 7 is an exemplary line identification mechanism in an embodiment.

Referring now to FIG. 7, therein is shown an exemplary line identification mechanism 701 in an embodiment. The exemplary line identification mechanism 701 depicts an image 702 with the feature lines 306 extracted from the sensor data local storage 110 of FIG. 1 has been addressed by the distortion correction unit 112 of FIG. 1.

First, pick a line 704 defined by the two end points, a top point 706 and a bottom point 708. Extract several sample points 710 from the line 704. The sample points 710 should have the same distance from one to the next. The sample point 710 can represent a pixel 712 from the image 702.

Second, identify a pixel patch 714 around each of the sample points 710 identified in the line 704. The pixel patch 714 can be an array, such as a 7×7 array, of the pixels 712 centered on the sample point 710. Extract the pixel patch 714 centered on the sample point 710. The size of the pixel patch 714 can be selected according to a machine learning algorithm in order to maximize efficiency of the line identification. The sample point 710 that is under analysis can be located at an array center 716. By way of an example, the values of the pixel 712 can be the color grading, density number, gray scale value, or the like.

Figure 8:
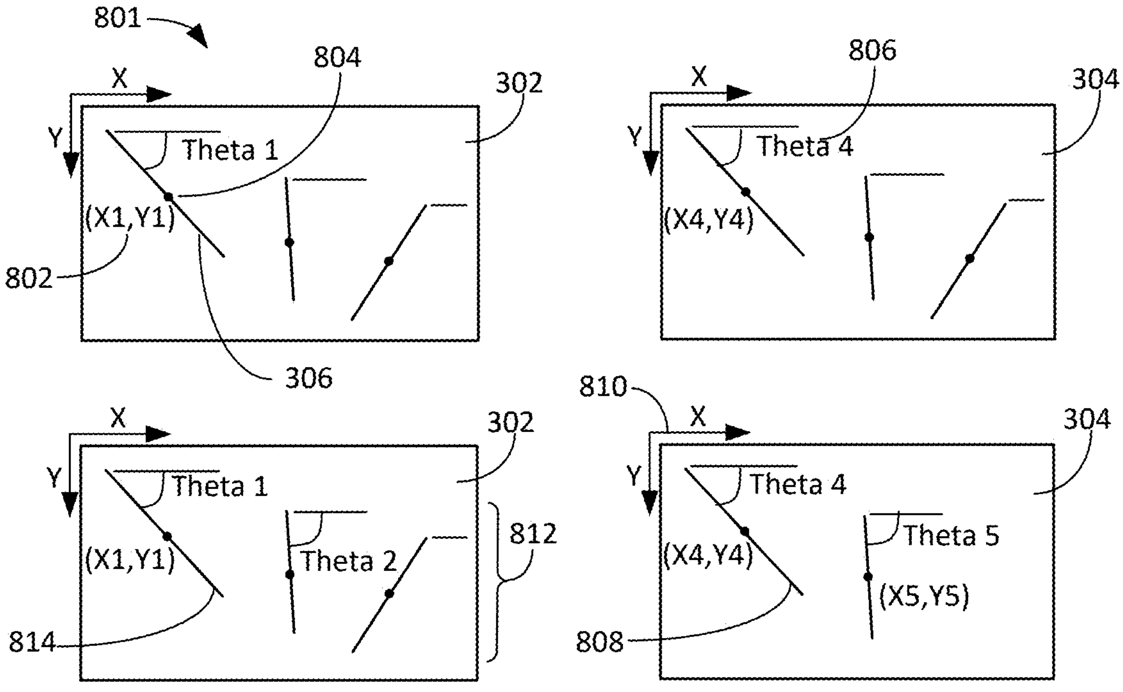
FIG. 8 is an exemplary line identification diagram through nearby lines in a previous frame.

Referring now to FIG. 8 therein is shown an exemplary line identification diagram 801 through nearby lines in a previous frame. The exemplary line identification diagram 801 depicts the Nth frame 302 and the N+1th frame 304 in a line identification process.

The first control circuit 512 can compute the line direction according to the top point 706 of FIG. 7 and the bottom pointy 708 of FIG. 7. The first control circuit 512 can compute the real-world coordinates 802, such as the GPS coordinates 115 of FIG. 1, of a middle point 804 positioned at the center of the feature line 306 being analyzed. The first control circuit 512 can analyze the feature lines 306 that are physically near a target line 808. A line direction relative to an X-axis 810 can be represented by an angle Theta 806 between the target line 808 and the X-axis 810.

The first control circuit 512 can identify nearby lines 812 in the Nth frame 302 according to the angle Theta 806 and the middle point 804 of the target line 808. A matched line 814 in the Nth frame 302 can be identified as a match for the target line 808 when the difference in the angle Theta 806 and the real-world position 802 are smaller than a dedicate threshold.

For all the nearby lines 812 in the Nth frame 302, the first control circuit 512 can extract the sample points 710 of FIG. 7 of the nearby lines 812 in the same number and position as the target line 808. The first control circuit 512 can also extract the pixel patches 714 of FIG. 7 of the same size near the sample points 710.

The first control circuit 512 can compute the ZNCC score 611 of FIG. 6 for all of the pixel patches 714 of the nearby lines 812. If the score is above the ZNCC threshold 612 of FIG. 6, it is considered as a good match. The first control circuit 512 can compute all of the ZNCC score 611 of the sample points 710. The first control circuit 512 can identify a matched line 814 for the target line 808 as the feature line 306.

If the first control circuit 512 determines more than one of the nearby lines 812 have the same value of the ZNCC score 611, then the one of the nearby lines 812 with the smaller difference in the angle Theta 806 or smaller distance from the middle point 804 will be selected as the matched line 814. This situation can arise when a reflection of one of the nearby lines 812 is analyzed.

The first control circuit 512 can check for multiple matches of the targeted line 808 were detected. At the completion of the process, each of the targeted lines 802 should have a single one of the matched line 814. If the first control circuit 512 detects that more than one of the matched lines 814 is mapped to a single one of the target line 808 or more than one of the targeted lines 808 is mapped to a single one of the nearby lines 812, the first control circuit 512 will select the nearby lines 812 with the smaller difference in the angle Theta 806 and the smaller difference in distance of the middle point 804.

Figure 9:
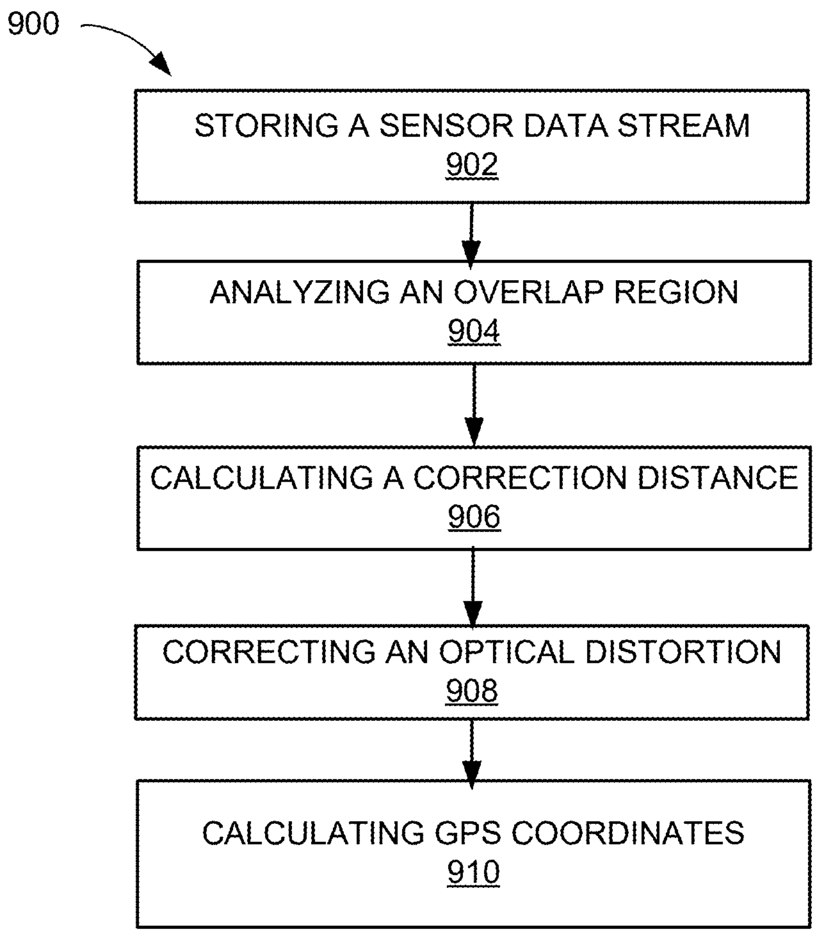
FIG. 9 is a flow chart of a method of operation of a compute system in an embodiment of the present invention.

Referring now to FIG. 9, therein is shown a flow chart of a method 900 of operation of a compute system 100 of FIG. 1 in an embodiment of the present invention. The method 900 includes: storing a sensor data stream, of a region of interest, provided by optical sensors in a block 902; analyzing an overlap region of the sensor data stream to identify a feature line that is viewed by a first optical sensor and a second optical sensor of the optical sensors in a block 904; calculating a correction distance, measured in pixels, for the first optical sensor by a position correction of the feature line in the overlap region in a block 906; correcting an optical distortion, of the first optical sensor, for the region of interest by applying the correction distance in a block 908; and calculating GPS coordinates of the feature line for controlling a device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A compute system comprising:
a control circuit configured to:
store a sensor data stream of a region of interest provided by optical sensors,
analyze an overlap region of the sensor data stream to identify a feature line that is viewed by a first optical sensor and a second optical sensor of the optical sensors,
calculate a correction distance, measured in pixels, for the first optical sensor by a position correction of the feature line in the overlap region,
correct an optical distortion of the first optical sensor in the sensor data stream for the region of interest by applying the correction distance, and
calculate GPS coordinates of the feature line for controlling a device.

2. The system as claimed in claim 1 wherein the control circuit is configured to apply the correction distance includes the control circuit is configured to:
extract intrinsic parameters of the first optical sensor including a scaling factor and a principal point location; and
scale the correction distance across the first optical sensor between the overlap region and the principal point location based on the scaling factor.

3. The system as claimed in claim 1 wherein the control circuit is configured to identify the optical distortion by analyzing a pose error of the first optical sensor identified in the overlap region of the region of interest.

4. The system as claimed in claim 1 wherein the control circuit is configured to extract the line segments by:
identify a line from an Nth frame;
apply a middle point at the GPS coordinates of the center of the line;
calculate an angle Theta between the line and an X-axis of the Nth frame; and
compare the GPS coordinates of the middle point and the angle Theta of the line in the Nth frame and an N+1th frame to identify the line segments extracted as the feature line.

5. The system as claimed in claim 1 wherein the control circuit is configured to:
extract line segments from an Nth frame of the region of interest,
calculate a zero-mean normalized cross-correlation (ZNCC) score for the line segments in the Nth frame and an N+1th frame,
identify the feature line by the ZNCC score greater than a ZNCC threshold, and
calculate the GPS coordinates of the feature line includes verifying the GPS coordinates of the feature line with a high-definition map.

6. The system as claimed in claim 1 wherein the control circuit is configured to generate an Nth frame by combining the sensor data stream from a front optical sensor, a rear optical sensor, a left optical sensor, and a right optical sensor, and correcting the optical distortion.

7. The system as claimed in claim 1 wherein the control circuit is configured to correct the optical distortion of the optical sensors includes individually adjusting a front optical sensor, a rear optical sensor, a left optical sensor, and a right optical sensor when creating an Nth frame.

8. A method of operation for a compute system comprising:
storing a sensor data stream, of a region of interest, provided by optical sensors;
analyzing an overlap region of the sensor data stream to identify a feature line that is viewed by a first optical sensor and a second optical sensor of the optical sensors;
calculating a correction distance, measured in pixels, for the first optical sensor by a position correction of the feature line in the overlap region;
correcting an optical distortion, of the first optical sensor, in the sensor data stream for the region of interest by applying the correction distance; and
calculating GPS coordinates of the feature line for controlling a device.

9. The method as claimed in claim 8 wherein applying the correction distance includes:
extracting intrinsic parameters of the first optical sensor including a scaling factor and a principal point location; and
scaling the correction distance across the first optical sensor between the overlap region and the principal point location based on the scaling factor.

10. The method as claimed in claim 8 further comprising analyzing a pose error of the first optical sensor identified in the overlap region of the region of interest for identifying the optical distortion.

11. The method as claimed in claim 8 wherein extracting the line segments by:
identifying a line from an Nth frame;
applying a middle point at the GPS coordinates of the center of the line;
calculating an angle Theta between the line and an X-axis; and
comparing the GPS coordinates of the middle point and the angle Theta of the line in the Nth frame and an N+1th frame for identifying the line segments extracted as the feature line.

12. The method as claimed in claim 8 further comprising:
extracting line segments from an Nth frame of the region of interest;
calculating a zero-mean normalized cross-correlation (ZNCC) score for the line segments in the Nth frame and an N+1th frame;
identifying the feature line by the ZNCC score greater than a ZNCC threshold;

calculating the GPS coordinates of the feature line includes verifying the GPS coordinates of the feature line with a high-definition map.

13. The method as claimed in claim 8 further comprising generating an Nth frame by combining the sensor data stream from a front optical sensor, a rear optical sensor, a left optical sensor, and a right optical sensor, and correcting the optical distortion.

14. The method as claimed in claim 8 further comprising correcting the optical distortion of the optical sensors includes individually adjusting a front optical sensor, a rear optical sensor, a left optical sensor, and a right optical sensor when creating an Nth frame.

15. A non-transitory computer readable medium including instructions executed by a processor for a compute system comprising:

storing a sensor data stream, of a region of interest, provided by optical sensors;

analyzing an overlap region of the sensor data stream to identify a feature line that is viewed by a first optical sensor and a second optical sensor of the optical sensors;

calculating a correction distance, measured in pixels, for the first optical sensor by a position correction of the feature line in the overlap region;

correcting an optical distortion, of the first optical sensor, in the sensor data stream for the region of interest by applying the correction distance; and calculating GPS coordinates of the feature line for controlling a device.

16. The non-transitory computer readable medium including the instructions as claimed in claim 15 wherein applying the correction distance including:

extracting intrinsic parameters of the first optical sensor including a scaling factor and a principal point location; and scaling the correction distance across the first optical sensor between the overlap region and the principal point location based on the scaling factor.

17. The non-transitory computer readable medium including the instructions as claimed in claim 15 further comprising analyzing a pose error of the first optical sensor identified in the overlap region of the region of interest for identifying the optical distortion.

18. The non-transitory computer readable medium including the instructions as claimed in claim 15 further comprising extracting line segments by:

identifying a line from an Nth frame;

applying a middle point at the GPS coordinates of the center of the line;

calculating an angle Theta between the line and an X-axis; and comparing the GPS coordinates of the middle point and the angle Theta of the line in the Nth frame and an N+1th frame for identifying the line segments extracted as the feature line.

19. The non-transitory computer readable medium including the instructions as claimed in claim 15 further comprising:

extracting line segments from an Nth frame of the region of interest;

calculating a zero-mean normalized cross-correlation (ZNCC) score for the line segments in the Nth frame and an N+1th frame;

identifying the feature line by the ZNCC score greater than a ZNCC threshold;

generating the Nth frame by combining the sensor data stream from a front optical sensor, a rear optical sensor, a left optical sensor, and a right optical sensor, and correcting the optical distortion.

20. The non-transitory computer readable medium including the instructions as claimed in claim 15 further comprising correcting the optical distortion of the optical sensors includes individually adjusting a front optical sensor, a rear optical sensor, a left optical sensor, and a right optical sensor when creating an Nth frame.

* * * * *